US 6,670,077 B1

(12) United States Patent
Huang

(10) Patent No.: US 6,670,077 B1
(45) Date of Patent: Dec. 30, 2003

(54) IMPREGNATED SEPARATOR FOR ELECTROCHEMICAL CELL AND METHOD OF MAKING SAME

(75) Inventor: Wei-Wei Huang, Westlake, OH (US)

(73) Assignee: Eveready Battery Company, Inc., St. Louis, MO (US)

( * ) Notice: Subject to any disclaimer, the term of this patent is extended or adjusted under 35 U.S.C. 154(b) by 165 days.

(21) Appl. No.: 09/675,760

(22) Filed: Sep. 29, 2000

(51) Int. Cl.⁷ .............................................. H01M 2/16
(52) U.S. Cl. ............................................................ 429/250
(58) Field of Search ................................. 429/250, 133, 429/134; 29/730, 623.1

(56) References Cited

U.S. PATENT DOCUMENTS

| 3,121,658 A | | 2/1964 | Orsino et al. | |
|---|---|---|---|---|
| 3,894,889 A | | 7/1975 | Gillman et al. | |
| 4,217,404 A | * | 8/1980 | Verzwyvelt | 427/430.1 |
| 4,374,232 A | * | 2/1983 | Davis | 525/243 |
| 5,888,666 A | | 3/1999 | Kawakami | |
| 6,291,106 B1 | * | 9/2001 | Daido et al. | 429/231.8 |
| 6,514,637 B2 | | 2/2003 | Treger et al. | |
| 2001/0028976 A1 | | 10/2001 | Treger et al. | |

FOREIGN PATENT DOCUMENTS

| WO | WO0036672 | 6/2000 |
|---|---|---|
| WO | WO0059052 | 10/2000 |

* cited by examiner

*Primary Examiner*—Laura Weiner
(74) *Attorney, Agent, or Firm*—Stewart A. Fraser

(57) ABSTRACT

A separator for an electrochemical cell and a method of assembling an electrochemical cell are provided. The separator includes a porous paper substrate impregnated and/or coated with a polymer solution that coagulates to prevent electrical shorting while allowing ion permeation. The method include the steps of providing a container having a bottom end and a top end and upstanding walls disposed therebetween, disposing positive electrode and negative electrodes in the container, providing a sheet of porous paper substrate, forming the sheet of porous substrate into a separator, applying alkaline solution to the separator, applying a liquid polymer material to the porous substrate in the presence of the alkaline solution so that the polymer solution coagulates to form a semi-solid material, and disposing the separator between the positive electrode and the negative electrode.

17 Claims, 5 Drawing Sheets

IMPREGNATED SEPARATOR FOR ELECTROCHEMICAL CELL AND METHOD OF MAKING SAME

BACKGROUND OF THE INVENTION

The present invention generally relates to electrochemical cells, i.e., batteries, and, more particularly, to a separator and method of making and assembling a separator in an electrochemical cell.

Conventional alkaline electrochemical cells generally include a steel cylindrical can having a positive electrode, referred to as the cathode, which comprises manganese dioxide as the active material. The electrochemical cell also includes a negative electrode, referred to as the anode, which comprises zinc powder as the active material. In bobbin-type cells, the cathode is typically formed against the interior surface of the steel can, while the anode is generally centrally disposed in a cylindrical cavity formed in the center of the cathode. A separator is located between the anode and the cathode, and an alkaline electrolyte solution containing potassium hydroxide (KOH) simultaneously contacts the anode, the cathode, and the separator. A conductive current collector is commonly inserted into the anode active material, and a seal assembly, which includes a polymeric seal, provides closure to the open end of the steel can to seal the active electrochemical materials in the sealed volume of the can.

In conventional bobbin-type zinc/manganese dioxide alkaline cells, the separator is commonly provided as a multiple layered ion permeable, non-woven fibrous fabric which separates the anode from the cathode. The separator maintains a physical dielectric separation of the positive electrode material and the negative electrode material and allows for the transport of ions between the electrode materials. In addition, the separator acts as a wicking medium for KOH solution and as a collar for preventing the anode gel from falling out. Examples of conventional separator materials include two or three layers of paper, which results in a total wet separator thickness in the range of about 11–18 mils. Conventional separators are usually formed either by preforming the separator material into a cup-shaped basket that is subsequently inserted into the cathode during assembly, or forming a basket during cell assembly by inserting into the cathode cavity multiple rectangular sheets of separator material angularly rotated ninety degrees relative to each other. The conventional preformed separators are typically made up of a sheet of non-woven fabric rolled into a cylindrical shape that conforms to the inside walls of the cathode and has a closed bottom end. According to another approach, the closed end is provided by inserting a dielectric seal in the form of a plug in the bottom end of the steel can and inserting a convolute cylindrical separator up against the plug.

The conventional separator employs a fibrous porous paper that generally requires multiple overlapping layers in order to prevent electrical conduction between the anode and the cathode. The use of a single layer of paper for a separator generally suffers from openings that are present in the porous paper which may allow a conductive path to be formed between the anode and the cathode. It is also possible that the graphite in the cathode may penetrate the separator to form a conductive path with the anode, thereby causing cell shorting. Further, the formation of zinc oxide within the pores of the paper separator may also form an electrically conductive path that causes cell shorting and leads to premature discharge.

The use of multiple paper layers increases the volume consumed by the separator, thereby leaving less volume for active electrochemical materials. In addition, a thicker separator generally increases the ionic resistance which results in a reduced ion permeation and limits the high rate discharge performance. Many conventional separators do not minimize the amount of separator material that is disposed in the cell, which results in reduced volume available for electrochemically active materials. Accordingly, it is therefore desirable to provide for a separator for use in electrochemical cells that efficiently separates the positive and negative electrodes, while minimizing the amount of material required to separate the electrodes, to thereby enhance ion permeation and maximize the volume available for electrochemically active materials.

SUMMARY OF THE INVENTION

The present invention improves the separation of the electrodes in an electrochemical cell with an enhanced separator, a method of making the separator, and a method of assembling the separator in an electrochemical cell. To achieve these and other advantages, and in accordance with the purpose of the invention as embodied and described herein, one aspect of the present invention provides for a separator for use in an electrochemical cell for separating a positive electrode and a negative electrode. The separator comprises a porous substrate capable of absorbing alkaline solution. The separator also has a polymer solution applied to the porous substrate in the presence of the alkaline solution. The polymer solution coagulates to form a semi-solid impregnation in the porous substrate and/or a semi-solid coating on the porous substrate that prevents electrical shorting and allows ion permeation through the separator. The resultant separator is capable of achieving reduced volume consumption and enhanced ion permeation.

According to another aspect of the present invention, a method of forming a separator is provided for use in an electrochemical cell for separating a positive electrode from a negative electrode. The method comprises the steps of providing a porous substrate and applying a coagulating agent to the porous substrate. The method further includes the steps of applying a liquid polymer solution to the porous substrate and allowing the polymer solution to coagulate in the presence of the coagulating agent to form a semi-solid material.

According to other aspects of the present invention, an electrochemical cell and a method of assembling an electrochemical cell are provided. The method includes the steps of providing a container having a bottom end and a top end and upstanding walls disposed therebetween, disposing a positive electrode in the container, and disposing a negative electrode in the container. The method also includes providing a porous substrate, forming the porous substrate material into a separator, and applying electrolyte solution to the separator. The method further includes the steps of applying a liquid polymer solution to the porous substrate in the presence of a coagulating agent so that the polymer solution coagulates to form a semi-solid material. The separator is disposed between the positive electrode and the negative electrode, preferably prior to applying the liquid polymer solution.

These and other features, advantages and objects of the present invention will be further understood and appreciated by those skilled in the art by reference to the following specification, claims and appended drawings.

DETAILED DESCRIPTION OF THE PREFERRED EMBODIMENTS

Figure 1:
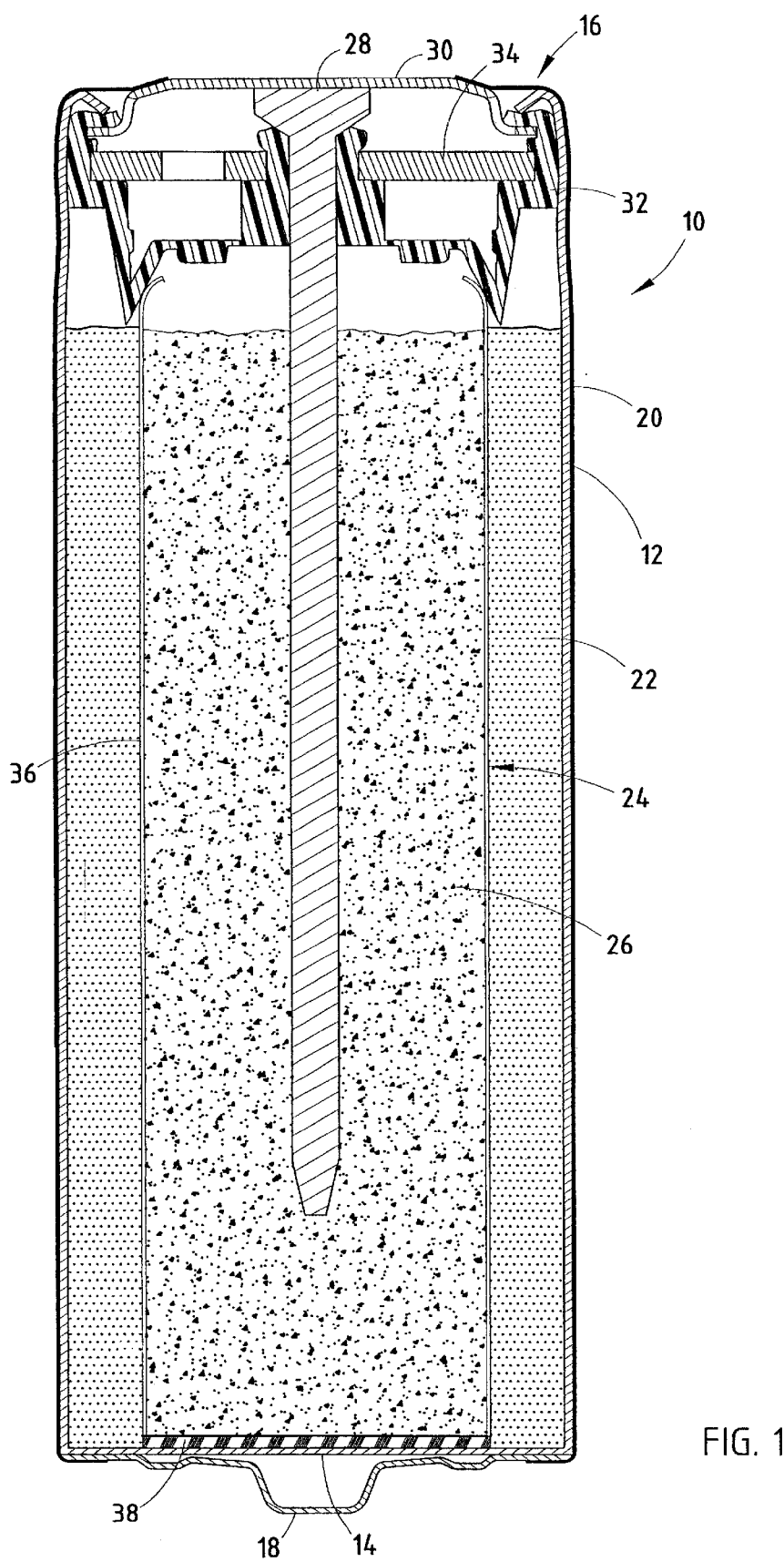
FIG. 1 is a longitudinal cross-sectional view of an electrochemical cell employing a separator according to the present invention.

Referring to FIG. 1, a cylindrical bobbin-type AA-size alkaline electrochemical cell 10 is shown therein. Electrochemical cell 10 includes a cylindrical steel can 12 having a closed bottom end 14 and an open top end 16. The closed bottom end of steel can 12 further includes a positive cover welded or otherwise attached thereto and formed of plated steel, with a protruding nub 18 at its center region, which forms the positive contact terminal of cell 10. A metalized plastic film label 20 is formed about the exterior surface of steel can 12, except the ends of steel can 12. Film label 20 is formed over the peripheral edge of the positive cover and may extend partially onto the negative cover as shown.

A cathode 22, preferably formed of a mixture of manganese dioxide, graphite, potassium hydroxide solution, and additives, is formed about the interior surface of steel can 12. A separator 24 is disposed about the interior surface of the cathode 22. An anode 26, preferably formed of zinc powder, a gelling agent, and additives, is disposed inside the separator 24 and in contact with a current collector 28 which may include a conductive nail having an elongated body and an enlarged head at one end. Accordingly, the cathode 22 is configured as the positive electrode and the anode is configured as the negative electrode. In addition, an alkaline electrolyte solution, preferably including potassium hydroxide (KOH), is disposed in contact with the cathode 22, anode 26, and separator 24.

The current collector 28 contacts the outer negative cover 30 which forms the negative contact terminal of cell 10. The outer negative cover 30 is preferably formed of plated steel, and may be held in contact with current collector 28 via pressure contact or a weld. An annular nylon seal 32 is disposed in the open end of steel can 12 to prevent leakage of the electrochemically active materials contained in steel can 12. An inner cover 34, which is preferably formed of a rigid metal, is provided to increase the rigidity and support the radial compression of nylon seal 32, thereby improving the sealing effectiveness. The inner cover 34 is configured to contact a central hub and peripheral upstanding wall of seal 32. Together, the current collector 28, nylon seal 32, and inner cover 34 form a collector and seal assembly that can be inserted as a unit into the open end 16 of steel can 12 to seal the active ingredients within the active cell volume. It should be appreciated that the outer negative cover 30 is electrically insulated from steel can 12 by way of nylon seal 32.

According to the present invention, the electrochemical cell 10 employs a thin separator 24 with high electrical resistance (low electrical conductivity) and enhanced ion permeation. According to the embodiment shown and described herein, the convolute separator 24 has cylindrical side walls 36, an open top end, and an open bottom end disposed on top of a dielectric disk 38 which isolates the anode 26 from the bottom end 14 of steel can 12. According to an alternate embodiment, the separator 24 may include a closed bottom end in lieu of the dielectric disk 38. The separator 24 is formed as described herein from a porous substrate, such as a fibrous paper, that is preferably rolled into a cylinder to form a single layer convolute separator, with or without a small amount of overlap. The fibrous paper may include cellulose, which is suitable ion permeable material. In addition, the separator 24 employs a polymer solution that is applied to the porous substrate and reacts with the potassium hydroxide electrolyte solution to coagulate and form a semi-solid impregnation and/or coating. The semi-solid impregnation and/or coating prevents electrical shorting through the separator 24 and allows for use of a reduced thickness paper. Separator 24 serves to provide physical separation between the cathode 22 and the anode 26, while allowing the permeation and transport of ions between the electrodes.

Figure 2:
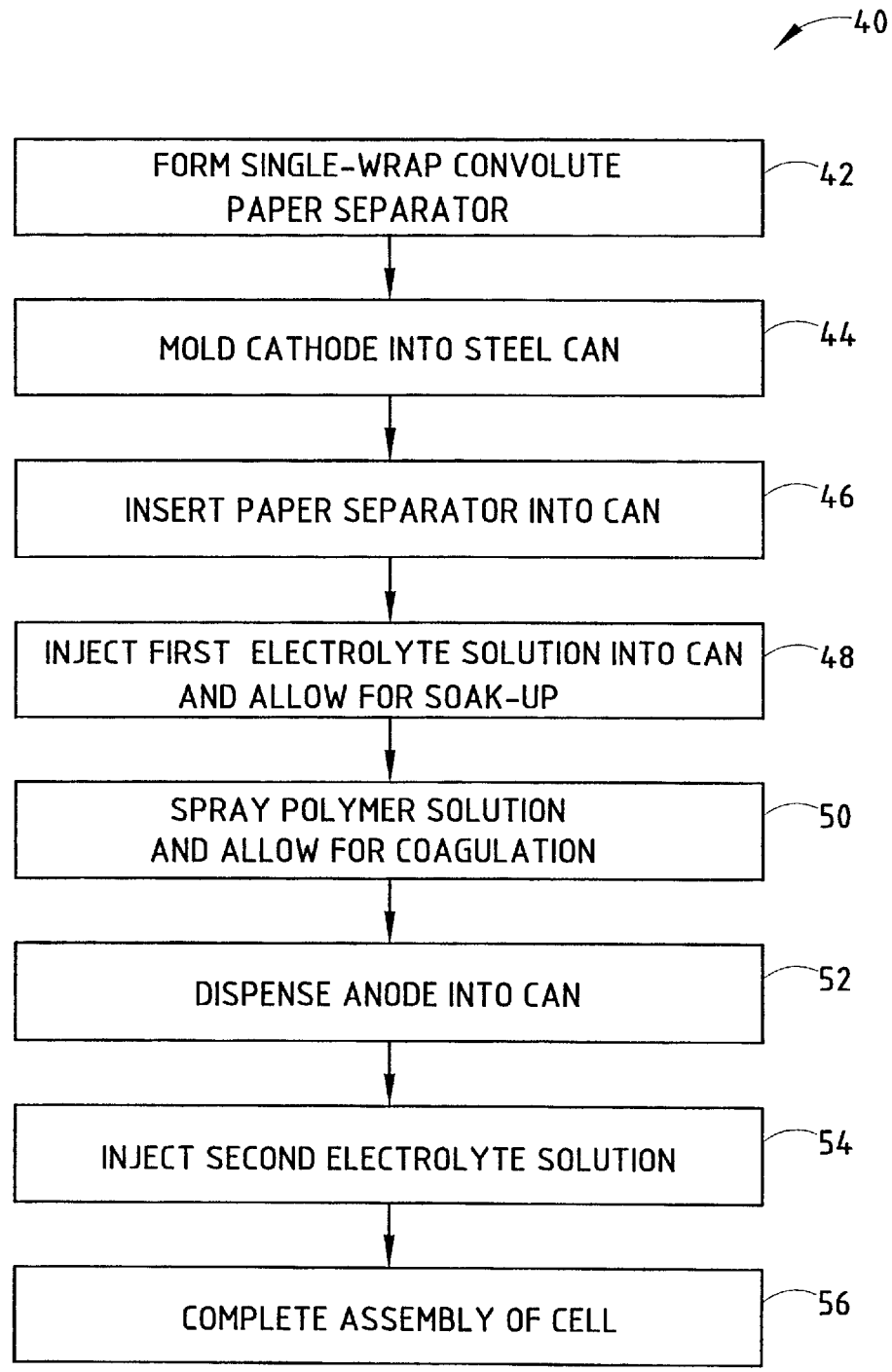
FIG. 2 is a flow diagram illustrating assembly of the separator in an electrochemical cell.

A method 40 of manufacturing the separator and assembling the separator in an electrochemical cell is illustrated in FIG. 2, and certain steps are further illustrated in FIGS. 3–7. With particular reference to FIG. 2, the method 40 includes step 42 of forming a convolute paper separator, such as a single wrap (one layer) paper separator. In step 44, the cathode is molded in the steel can using a known cathode formation technique, such as impact molding or ring molding. In step 46 the single-wrap paper separator is inserted into the cathode of the steel can such that the separator abuts the inner cylindrical walls of the cathode. If the separator has an open bottom end, a dielectric disk is disposed between the separator and the closed bottom end of the steel can. In step 48, an alkaline electrolyte solution is injected into the steel can, preferably in the interior of the separator, and the separator is allowed to soak up (i.e., wick up) the alkaline electrolyte solution. In an AA-size cell, the soak up may be complete within ten to twenty minutes. Next, in step 50 a polymer solution is sprayed on the inner walls of the separator to provide an impregnation and/or a coating which interacts with the potassium hydroxide electrolyte solution to coagulate and form a semi-solid impregnation within the separator and/or a semi-solid coating on the paper separator. The coagulation may take approximately one minute or less to transition to the semi-solid material. Next, in step 52, the anode, such as a gel-type anode, is dispensed in the separator so that the anode abuts the inner walls of the separator. In step 54, a second injection of alkaline electrolyte solution is then introduced into the steel can, and, in step 56, a collector and seal assembly is assembled to seal closed the open end of the steel can to thereby complete assembly of the cell.

Figure 5:
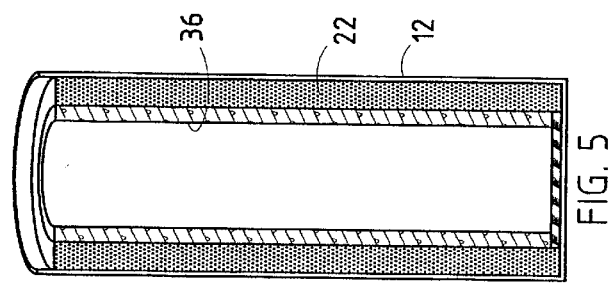
FIG. 5 is a longitudinal cross-sectional view of a partially assembled cell illustrating the absorption of alkaline electrolyte solution by the separator.
Figure 4:
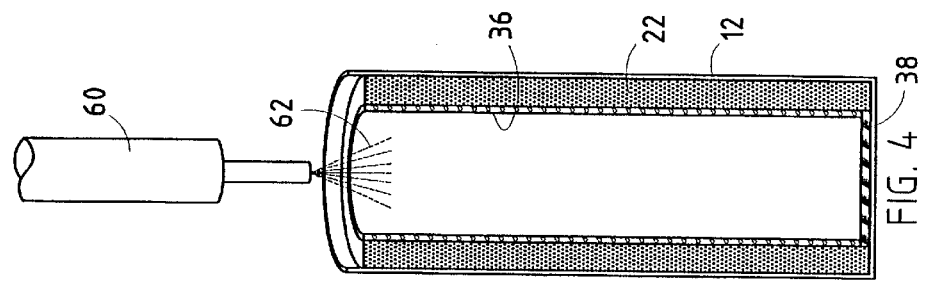
FIG. 4 is a longitudinal cross-sectional view of a partially assembled electrochemical cell illustrating the step of adding alkaline electrolyte solution to the paper separator.
Figure 3:
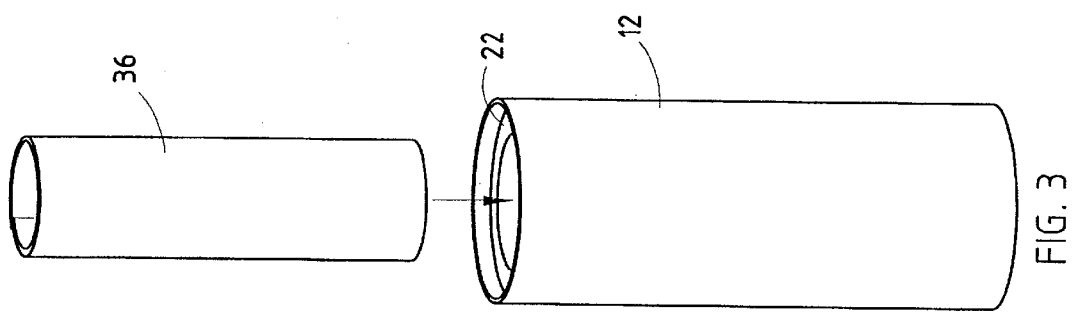
FIG. 3 is a perspective view of a paper separator being inserted into an electrochemical cell during assembly.

Referring to FIG. 3, the convolute paper separator 36 is shown being disposed into a cylindrical opening provided on the inner walls of the cathode 22 in steel can 12. The paper separator 36 may be a single layer of porous paper having a slight overlap as shown. In FIG. 4, the first injection of alkaline electrolyte solution 62 is shown being injected into the steel can 12 generally within the central cavity formed in the separator 36 via an alkaline solution dispenser 60. Referring to FIG. 5, the separator 36 is shown expanded after absorbing at least some of the alkaline electrolyte solution which causes the paper separator 36 to saturate with KOH liquid and expand in thickness. The separator may double in thickness during the soak up process.

Figure 7:
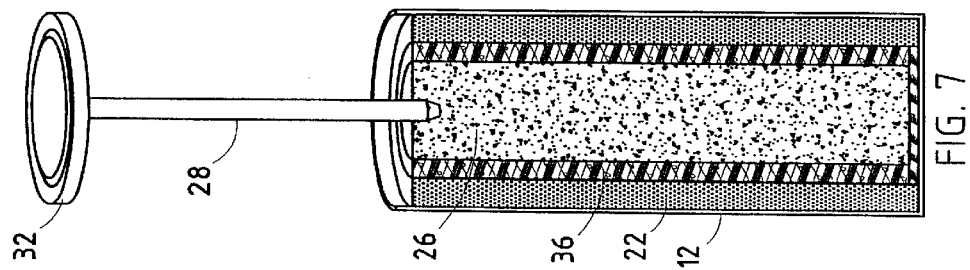
FIG. 7 is a longitudinal cross-sectional view of the cell illustrating the insertion of an anode and assembly of a collector assembly.
Figure 6:
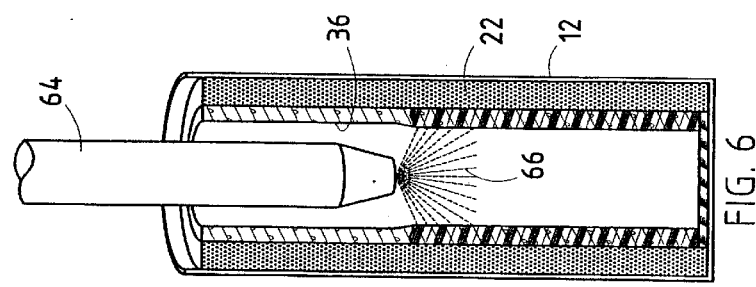
FIG. 6 is a longitudinal cross-sectional view of the electrochemical cell illustrating the application of a polymer solution to the separator.

In FIG. 6, the polymer solution 66 is shown being sprayed onto the inner walls of the saturated paper separator via a spray nozzle 64. The polymer solution 66 is preferably applied uniformly onto the inside walls of the separator. The polymer solution reacts with the potassium hydroxide alkaline electrolyte solution such that the potassium hydroxide alkaline electrolyte solution coagulates to form a semi-solid material that is electrically non-conductive and ion permeable. The potassium hydroxide alkaline electrolyte solution acts as a coagulating agent to provide a film of aggregated semi-solid particles. The semi-solid material is impregnated within and/or coated on the separator 36. FIG. 7 shows the anode 26 dispensed in the separator 36, and a collector assembly, made up of collector 28 and seal 32, being disposed in the open end of the steel can 12. Once the collector assembly is placed on the open end, the open end of the steel can 12 is then crimped over the outer cover to close the steel can 12, and thereafter a label may be applied to the outer side walls of the steel can 12 to complete assembly of the electrochemical cell.

Figure 8A:
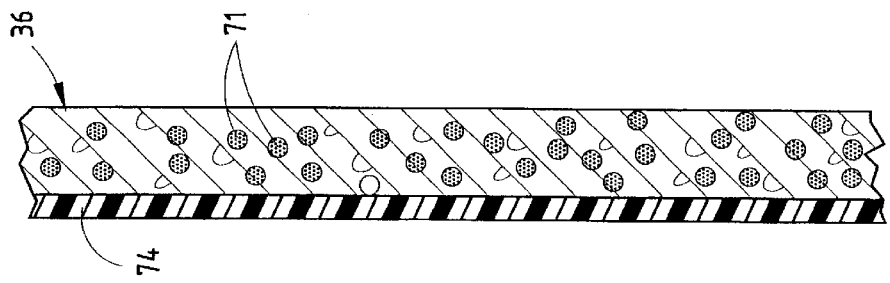
FIG. 8A is a cross-sectional view of the porous paper separator illustrating the porosity prior to alkaline solution absorption and impregnation of the polymer solution.
Figure 8B:
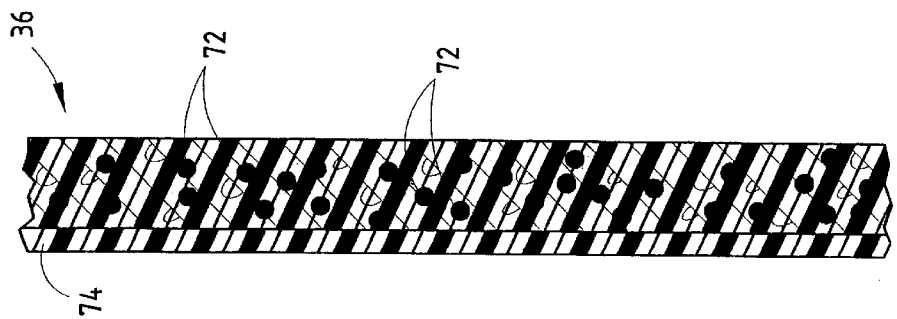
FIG. 8B is a cross-sectional view of the separator following absorption of alkaline solution, yet prior to application of the polymer solution.
Figure 9A:
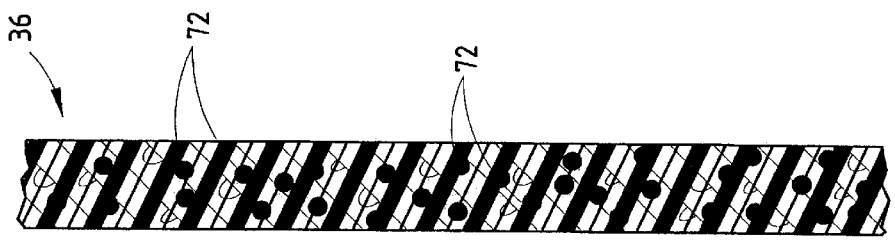
FIG. 9A is a cross-sectional view of the separator illustrating substantially complete impregnation of the polymer solution, according to one embodiment.
Figure 9B:
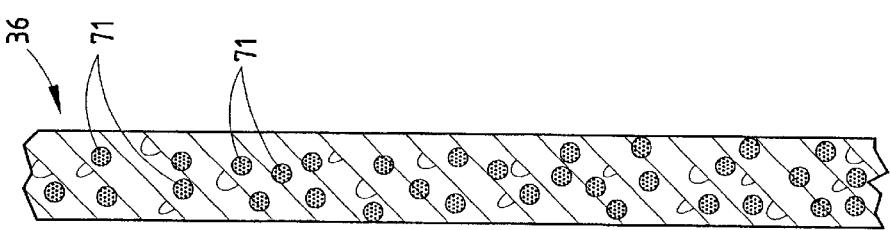
FIG. 9B is a cross-sectional view of the separator illustrating both the impregnation and a coating of polymer solution, according to another embodiment.
Figure 9C:
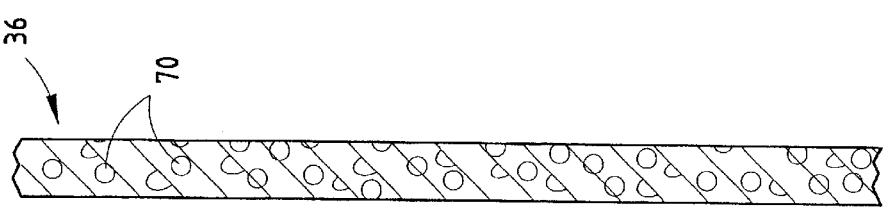
FIG. 9C is a cross-sectional view of the separator illustrating a surface coating only of the polymer solution, according to a further embodiment.

Referring to FIG. 8A, the porous substrate of paper separator 36 is shown made of a fibrous paper, such as cellulose, having pores 70 formed therein. The pores 70 typically vary in shape and size and provide void volume when the paper is dried out. The porous substrate of paper separator 36 is preferably absorbent to the potassium hydroxide alkaline solution so that the potassium hydroxide alkaline solution is absorbed into the void volume of the pores 70 to expand in thickness and provide liquid filled pores 71 as shown in FIG. 8B. The application of the polymer solution causes a reaction with the potassium hydroxide so that the polymer solution coagulates and forms a semi-solid material. The coagulation may result in substantially all semi-solid material being impregnated within the separator 36 so as to at least partially fill the liquid filled pores 71 with a semi-solid material as shown in FIG. 9A, according to one embodiment. The saturated separator with semi-solid impregnation preferably has a thickness in the range of 0.5 to 4.0 mils. If the sprayed on polymer solution is more than what the liquid filled pores 71 can absorb, then the excess polymer solution forms a semi-solid coating 74 on the surface of the paper separator 36, in addition to the impregnation within the separator, as shown in FIG. 9B. The semi-solid coating (film) 74 preferably has a thickness in the range of 0.1 to 4.0 mils. If the pores 70 of the separator 36 are substantially filled with potassium hydroxide solution, the application of the polymer solution primarily causes a thin semi-solid coating 74 to be formed on the surface of the paper separator 36, with minimal impregnation, as shown in FIG. 9C.

The separator of the present invention employs an aqueous polymer solution that transforms from a liquid phase to a semi-solid phase in the presence of an alkaline electrolyte solution. This transformation is known and referred to herein as coagulation. The coagulation is caused by a change in the pH of the polymer solution.

The polymer solution may include methylcellulose according to one example. Alternately, the polymer solution may include poly(vinyl alcohol) solution, or poly(sodium 4-styenesulfonate) according to other examples. It should be appreciated that various liquid polymer solutions may be employed that transform from a liquid to a semi-solid medium in the presence of the alkaline electrolyte.

Examples of each of the aforementioned polymer solutions are described below. According to a first example, a single-wrap convolute paper separator was formed and inserted into the cathode cavity. After the first shot of potassium hydroxide alkaline electrolyte solution was added into the cavity formed by the convolute separator and absorbed by the separator and cathode, 0.24 grams of polymer solution was sprayed onto the surface of the convolute separator. The polymer solution contained five percent by weight methylcellulose and ninety-five percent by weight deionized water, and had a viscosity of approximately 290 centipoise (cps) (measured using Brookfield viscometer LVDV-II, spindle 2, 12 rpm at 21° C.). A predetermined amount of anode gel was then introduced into the separator basket. According to a second example, the above-described process in the first example can be repeated with the exception that the polymer solution is changed from five weight percent methylcellulose solution to five weight percent poly(vinyl alcohol) solution. According to a third example, the same process can be repeated, with the exception that the polymer solution is changed from five weight percent methylcellulose solution to five to forty weight percent poly(sodium 4-styenesulfonate).

The weight of the polymer solution applied to the separator for an AA-size cell is preferably within the range of 0.05 to 0.5 grams, and more preferably is in the range of 0.1 to 0.35 grams. The viscosity of the liquid polymer solution is preferably within the range of 50 to 1,000 cps, and more preferably is in the range of 200 to 500 cps.

Figure 10:
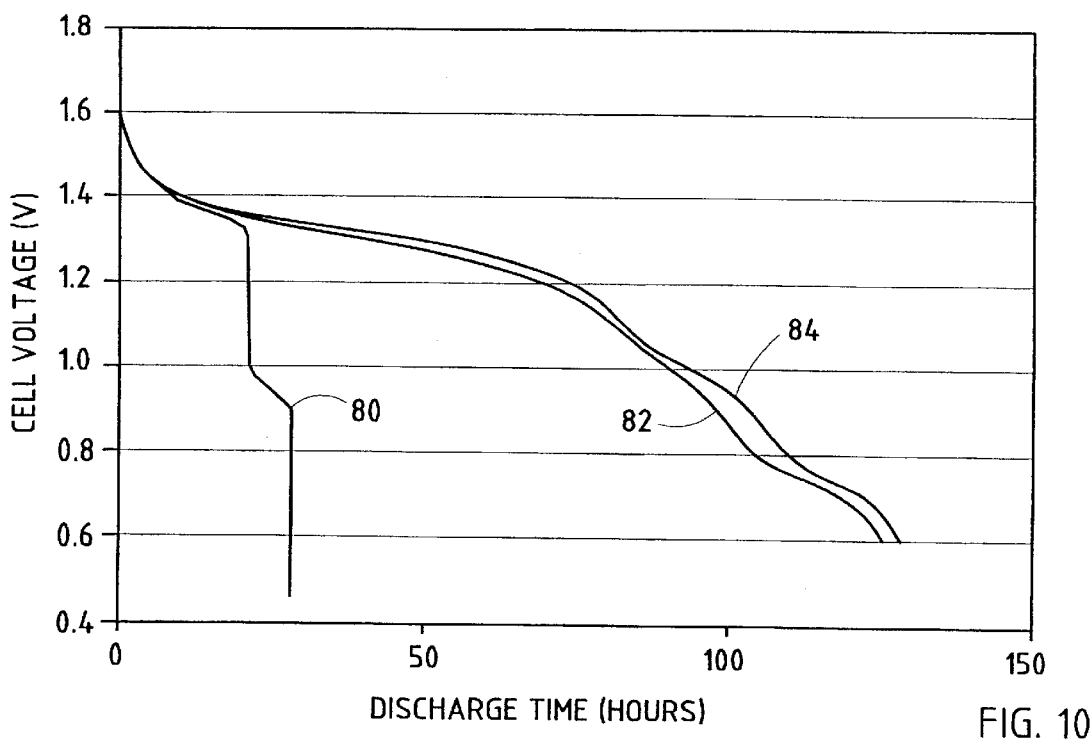
FIG. 10 is a graph illustrating performance of an AA-size cell having the separator of the present invention compared to both a prior known separator and a single layer paper separator without the polymer solution.

Referring to FIG. 10, discharge curves of AA-size electrochemical cells are shown using a single-wrap paper separator without the polymer solution in curve 80, a conventional double wrap separator in curve 82, and the single wrap separator with the coagulated polymer solution according to the present invention in curve 84. Each cell was tested at intermittent and low rate discharge under a 43 ohm load (four hours per day) at room temperature. The single wrap separator without the coagulated polymer solution experienced a short circuit as exhibited by the sudden voltage drop in curve 80. The coated single-wrap separator of curve 84 prevented shorting at intermittent and low range discharge and achieved enhanced service performance as compared to curves 80 and 82.

Figure 11:
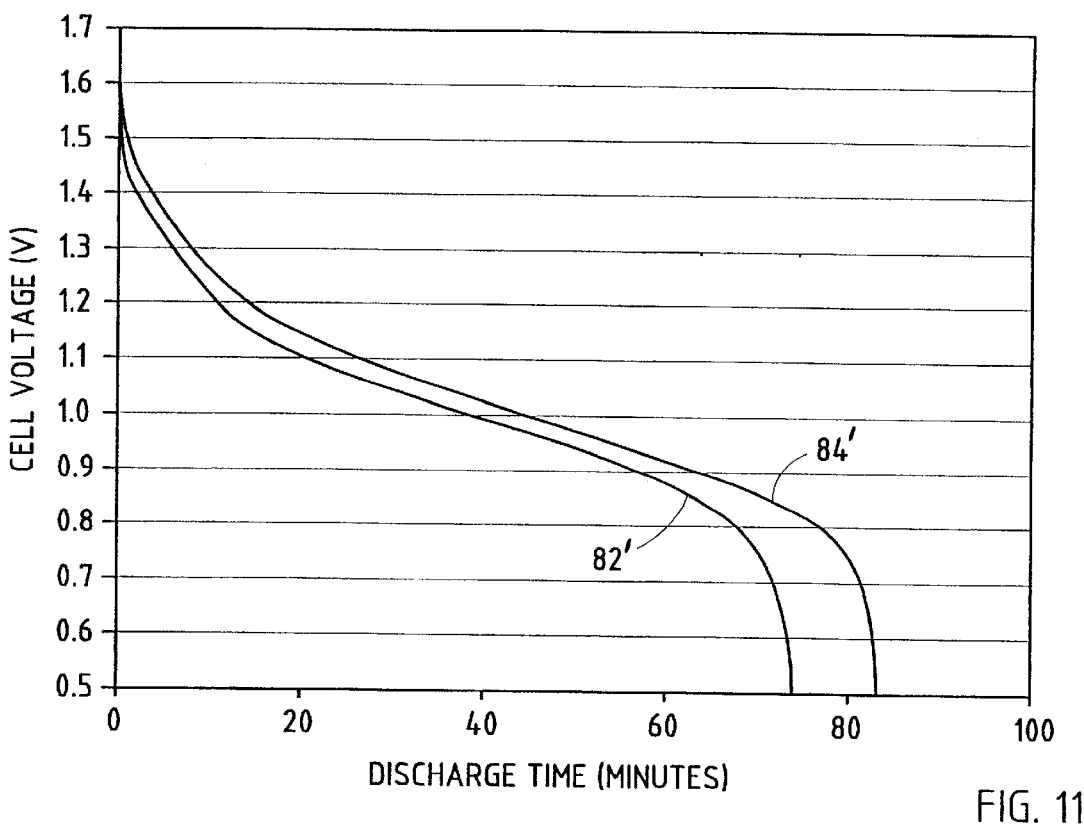
FIG. 11 is a graph illustrating performance of an AA-size cell having the separator of the present invention compared to a prior known separator during high rate discharge.

Referring to FIG. 11, the discharge curves of AA-size electrochemical cells as shown using a conventional double-wrap separator without the coagulated polymer solution in curve 82', and with a single-wrap separator having the coagulated polymer solution of the present invention in curve 84', under a continuous one amp load at room temperature. As shown in this figure, the coagulated single-wrap paper separator in curve 84' advantageously increases the discharge time at high drain rate.

The separator and method of assembling have been described in connection with an in situ coagulation process where the formation of the polymer solution from liquid to a semi-solid phase is realized in the steel can. It should be appreciated that the separator alternately may be completed in an ex situ coagulation process prior to insertion in the steel can. According to the alternate embodiment, electrolyte solution may be applied to the separator and allowed to soak in prior to insertion in the steel can. Also, prior to insertion, the polymer coating can be sprayed on the surface of the separator so as to coagulate and form the semi-solid impregnation and/or coating. The separator may then be inserted into the cathode cavity in the steel can, and electrolyte solution applied thereafter. This alternate embodiment allows for the preassembly of the separator, however, the separator may require substantially more time to soak up the electrolyte solution when the final injection of alkaline solution is applied.

Accordingly, the present invention advantageously provides for a thin separator which prevents electrical shorting and enhances the ion permeation therethrough, to achieve a reduced thickness separator that results in more volume available for active electrochemical materials, thereby enhancing the discharge performance of the electrochemical cell. It should also be appreciated that the present invention may be useful in electrochemical cells comprising acidic or non-aqueous electrolyte.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

The invention claimed is:

1. A separator for use in an electrochemical cell for separating a positive electrode and a negative electrode, said separator comprising:
   a porous substrate comprising fibrous paper wherein said fibrous paper is cellulose based;
   a coagulating agent; and
   a polymer solution applied to said porous substrate in the presence of the coagulating agent to coagulate and form a semi-solid material wherein said polymer solution is impregnated into pores in said porous substrate.

2. The separator as defined in claim 1, wherein said porous substrate comprises a convolute sheet rolled into the shape of a cylinder.

3. The separator as defined in claim 1 wherein said separator has a dry thickness in the range of 0.5 to 4.0 mils.

4. The separator as defined in claim 1, wherein said polymer solution is provided as a coating on one side of said porous substrate.

5. The separator as defined in claim 1 wherein said polymer solution forms a semi-solid material having a thickness in the range of 0.1 to 4.0 mils.

6. The separator as defined in claim 1, wherein said coagulating agent comprises alkaline solution.

7. The separator as defined in claim 6, wherein said alkaline solution comprises potassium hydroxide.

8. The separator as defined in claim 1 wherein said polymer solution comprises one of the group consisting of methylcellulose, poly(vinyl alcohol), and poly(sodium 4-styenesulfonate).

9. The separator as defined in claim 1 wherein said semi-solid material prevents electrical shorting and allows ion permeation through the separator.

10. An electrochemical cell comprising:
    a container having bottom and top ends and an upstanding wall disposed therebetween;
    a positive electrode disposed in said container;
    a negative electrode disposed in said container;
    an electrolyte solution; and
    a separator disposed between said positive electrode and said negative electrode, said separator comprising a single layer of a porous substrate and a polymer solution applied in the presence of a coagulating agent to coagulate and form a semi-solid material, said porous substrate comprises fibrous paper, said fibrous paper is cellulose based.

11. The electrochemical cell as defined in claim 10, wherein said porous substrate comprises a convolute sheet rolled into the shape of a cylinder.

12. A method of forming a separator for use in an electrochemical cell for separating a positive electrode from a negative electrode, said method comprising the steps of:
    providing a porous substrate;
    applying a coagulating agent to said porous substrate;
    applying a liquid polymer solution to said porous substrate, wherein said liquid polymer impregnates said porous substrate;
    allowing said polymer solution to coagulate in the presence of said coagulating agent to form a semi-solid material; and
    rolling said sheet of porous substrate into a cylindrical shape.

13. A method of assembling an electrochemical cell, said method comprising the steps of:
    providing a container having a bottom end and a top end and upstanding walls disposed therebetween;
    disposing a positive electrode in said container;
    disposing a negative electrode in said container;
    providing a porous substrate;
    forming said porous substrate into a separator;
    applying electrolyte solution to said separator;
    applying a liquid polymer solution to said porous substrate in the presence of a coagulating agent so that said polymer solution coagulates to form a semi-solid material, wherein said step of applying a liquid polymer comprises impregnating said porous substrate with said liquid polymer; and
    disposing said separator between said positive electrode and said negative electrode.

14. The method as defined in claim 13, wherein said coagulating agent comprises an electrolyte solution.

15. The method as defined in claim 14, wherein said alkaline electrolyte solution comprises potassium hydroxide.

16. The method as defined in claim 13, wherein said polymer solution comprises one of the group consisting of methylcellulose, poly(vinyl alcohol), and poly(sodium 4-styenesulfonate).

17. The method as defined in claim 13, wherein said semi-solid material prevents electrical shorting and allows ion permeation through the separator.

* * * * *